(12) United States Patent
Kudinov et al.

(10) Patent No.: US 10,305,604 B1
(45) Date of Patent: May 28, 2019

(54) COHERENT APERTURE COMBINING USING MACHINE LEARNING

(71) Applicant: Facebook, Inc., Menlo Park, CA (US)

(72) Inventors: Konstantin Kudinov, Los Angeles, CA (US); Amy Zhang, San Francisco, CA (US); Tobias Gerard Tiecke, Menlo Park, CA (US); Kevin Michael Birnbaum, Reseda, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/857,514

(22) Filed: Dec. 28, 2017

(51) Int. Cl.
*H04B 10/00* (2013.01)
*H04B 10/67* (2013.01)
*G06T 7/73* (2017.01)
*H04B 10/69* (2013.01)
*H04B 10/116* (2013.01)

(52) U.S. Cl.
CPC ............ *H04B 10/671* (2013.01); *G06T 7/74* (2017.01); *H04B 10/116* (2013.01); *H04B 10/697* (2013.01); *G06T 2207/10016* (2013.01); *G06T 2207/20081* (2013.01); *G06T 2207/30168* (2013.01)

(58) Field of Classification Search
USPC .................................................. 398/118–131
See application file for complete search history.

(56) References Cited

U.S. PATENT DOCUMENTS

| | | | | |
|---|---|---|---|---|
| 3,566,126 A * | 2/1971 | Kenneth | ............ | H04B 10/1125 359/245 |
| 4,583,852 A * | 4/1986 | Cassidy | ................. | G01B 11/26 356/139.03 |
| 4,653,911 A * | 3/1987 | Fortin | .................... | G01B 11/26 356/138 |
| 5,517,016 A * | 5/1996 | Lesh | .................... | G01B 11/272 250/201.1 |
| 5,864,131 A * | 1/1999 | Wagers | .................... | B64G 1/66 250/203.6 |
| 5,973,310 A * | 10/1999 | Lunscher | ................. | G01S 3/781 250/201.1 |
| 8,044,332 B2 * | 10/2011 | Feinberg | ................... | G01J 9/00 250/201.9 |
| 8,780,195 B1 * | 7/2014 | Rubin | ...................... | H04N 7/18 348/114 |
| 9,794,540 B2 * | 10/2017 | Barron | ..................... | G06T 5/001 |
| 9,830,694 B2 * | 11/2017 | Bryll | ..................... | G02B 3/0081 |
| 9,991,958 B2 * | 6/2018 | Riesing | ................... | G01S 3/786 |
| 2004/0179848 A1 * | 9/2004 | Belenkii | ............... | H04B 10/112 398/131 |
| 2006/0024061 A1 * | 2/2006 | Wirth | .................. | H04B 10/1125 398/129 |
| 2007/0077071 A1 * | 4/2007 | Belenkiy | ............... | G01S 17/023 398/130 |
| 2008/0142691 A1 * | 6/2008 | Ooi | ....................... | G06F 3/0317 250/221 |

(Continued)

*Primary Examiner* — Agustin Bello
(74) *Attorney, Agent, or Firm* — FisherBroyles, LLP (57) ABSTRACT

An optical system for responding to distortions in incident light in a free space optical communication system comprises a machine learning output storing at least an indication of multiple images and corresponding positioning or orientation attributes for one or more optical elements; a sensor configured to generate an image; and a component configured to adjust the one or more optical elements based on the generated image.

20 Claims, 9 Drawing Sheets

(56) References Cited

U.S. PATENT DOCUMENTS

| | | | |
|---|---|---|---|
| 2008/0232707 A1* | 9/2008 | Lee | G06T 5/003 |
| | | | 382/255 |
| 2011/0239169 A1* | 9/2011 | Tirapu-Azpiroz | G03F 1/38 |
| | | | 716/55 |
| 2012/0099702 A1* | 4/2012 | Engel | A61B 6/00 |
| | | | 378/62 |
| 2012/0257197 A1* | 10/2012 | Feldkhun | G01N 21/4795 |
| | | | 356/301 |
| 2015/0359512 A1* | 12/2015 | Boctor | G01S 15/8997 |
| | | | 600/444 |
| 2016/0104284 A1* | 4/2016 | Maguire | G06T 7/80 |
| | | | 348/187 |
| 2017/0023867 A1* | 1/2017 | Staals | G03F 7/70633 |
| 2017/0054895 A1* | 2/2017 | Wan | H04N 5/23212 |
| 2017/0061601 A1* | 3/2017 | Bryll | G02B 3/0081 |
| 2017/0249367 A1* | 8/2017 | Bergsma | G06F 3/0482 |
| 2017/0366264 A1* | 12/2017 | Riesing | G01S 3/786 |
| 2018/0007337 A1* | 1/2018 | Barron | G06T 5/001 |

* cited by examiner

COHERENT APERTURE COMBINING USING MACHINE LEARNING

BACKGROUND

Wireless communication systems transfer data from a transmitter of one station to a receiver of another station. In some applications, one of the stations can be ground based (e.g., stationary) while the other station is carried by a flying vehicle (e.g., a satellite in Earth's orbit, an airplane or an unmanned aerial vehicle (UAV)). Furthermore, multiple stations can be ground based and in communication with one or more flying objects, or both stations can be part of flying vehicles. These wireless communication systems are sometimes used for Internet connections, especially if the land-based network is underdeveloped. These ground/airborne communication systems have to uplink (UL) and downlink (DL) large and ever-increasing volumes of data. Such large volumes of data form today's complex telecommunication devices and networks, and are fast outpacing bandwidth offered by today's satellite communications technology. Airborne vehicles typically communicate with other airborne or ground-based stations using microwave or radiofrequency (RF) bands. However, a major challenge for conventional microwave and RF communications is the highly constrained spectrum allocation imposed on these communication bands.

Free-space optical (laser) communications (FSO or Lasercom) is immune to spectrum allocation due to virtually unlimited bandwidth of the optical regions (greater than 100 Tb/s). While experimental FSO technology is now available for downlinking data at 100's of Gb/s from air or space, these solutions are complex and expensive, require relatively large components and consume large amounts of power. One of the challenges associated with free space optical communications is the ability to maintain a proper alignment between a receiver of the optical beam that is subject to atmospheric turbulence. Such alignment issues are further complicated when one or both of the receiver and transmitter are moving.

DETAILED DESCRIPTION

Various of the disclosed embodiments are directed to coherent aperture combining using machine learning. Free-space optical (laser) communications (FSO or Lasercom) provides tremendous network bandwidth possibilities, but alignment of received signals can be necessary to sustainably rely on these bandwidth possibilities. For example, a light may be received by one or more light sensors, e.g., quadrant detectors (also referred to herein as "quadrature detectors"), pixelated sensors (also known as "camera sensors"), etc. The light sensors may receive the light at various polarizations, wavelengths, and phases. These variations can be intentional or accidental, e.g., caused by environmental disturbances. Various electromechanical devices can be used to adjust lenses or mirrors in an attempt to increase signal coherence by aligning the unintended variations. As an example, when the light is received by a quadrant detector, "tip and tilt" control mechanisms may adjust the position and orientation of lenses and/or mirrors to stabilize the alignment.

In some embodiments, a "pixelated detector" (also referred to herein merely as a sensor) can be used to capture a current a light pattern that is evident based on the current positions of the lenses and mirrors of the FSO system. The pixelated detector may generate an image, e.g., having 64 by 64 pixels. Throughout the specification and figures, whenever the term "image" is used, it is to be understood that the image can be a sensor reading corresponding to the sensor that is employed, e.g., 4-pixel reading when a quadrature detector is employed, 64×64-pixel reading when a 64×64-pixel sensor is employed, etc. A controller can compare the received image to previously stored images and then control one or more actuators to quickly change the position and orientation of one or more lenses and/or mirrors. The positions and orientation of the lenses or mirrors may be specified in association with a previously stored image to improve signal coherence. By quickly evaluating the present condition and commanding actuators to change the position of optical elements (e.g., mirrors, beam splitters such as prisms or lenses, and/or sensors), the disclosed system is able to quickly improve signal coherence without using overly complicated electronics or optical surfaces.

Various techniques exist for comparing two images to determine which images are more similar than other images. For example, features can be extracted and compared (e.g., how many "hotspots" (bright areas) exist, how far the hotspots are from the center of the image or the centers of the four quadrants of the image, symmetry of the image, etc.) Thus, any two images can be compared to compute a "distance" from each other. In some embodiments, after selecting a "closest" previously stored image (e.g., the distance between the presently generated image and the previously stored image is small), the FSO system may provide additional interpolated position or orientation computations to further position or align the optical elements to reduce phase differences or other errors. Throughout the figures and descriptions, wherever quadrature detectors, pixelated sensors, camera sensors, or similar terms are illustrated or used, it is to be understood that any similar sensor can be used in various embodiments. As is known in the art, a quadrant detector (also referred to herein as a quadrature detector, or simply "quad detector") has the equivalent of four "pixels," pixelated sensors can have dozens or hundreds of pixels, and camera sensors can have many thousands or even millions of pixels. Thus, although they can sense in various resolutions, they perform a common function of sensing light or other bandwidths of radiation, typically in or near the visible light bands. Other nearby bands can include infrared or ultraviolet.

In various embodiments, the disclosed FSO system may employ one or more machine learning techniques to generate the stored images and associated position and orientation information optical elements. Various machine learning models exist, e.g., convolutional neural networks, various regression models (including k-neighbors regression), support vector machines, etc. The disclosed FSO system can employ one or more of these machine learning models. One skilled in the art would recognize that various models can be selected and combined in ways that improve accuracy and also reduce computational complexity. The machine learning techniques can be supervised or unsupervised. In a supervised system, the FSO system may receive a set of images as a corpus of "learning" data with labels identifying, e.g., whether characteristics of the images, e.g., whether coherent, properly aligned, misaligned, etc. The system may also receive position and alignment information for optical elements, e.g., to correct the phase differences or other errors. In various embodiments, the position and/or alignment information can be absolute values, relative values, mathematically formulae, etc. In various embodiments, the machine learning described herein can be performed end-to-end, meaning that it can account for all nonlinearities and other problems of optical alignment, e.g., without using the mechanical or optical elements described or illustrated herein.

In an unsupervised system, the FSO system may receive one or more "ideal" benchmark images in addition to the corpus of learning data, and the FSO system may experiment with various positioning and orientation information for the optical elements to cause the present images to be as close as possible (e.g., using image comparison techniques described above) to the "ideal" images. The FSO system may then store the various position and alignment information in association with the received non-ideal images.

In some embodiments, the quadrature detector may be unnecessary because the FSO system is able to reliably position the optical elements based only on the image the pixelated detector generates. In various embodiments, the FSO system may ignore phase differences altogether and simply attempt to move a current image as close as possible to an ideal benchmark image, e.g., using a constant feedback loop in association with the controller and actuators to adjust the alignments and positions of the optical elements.

In various embodiments, the FSO system can be configured to use different numbers of apertures.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Figure 1:
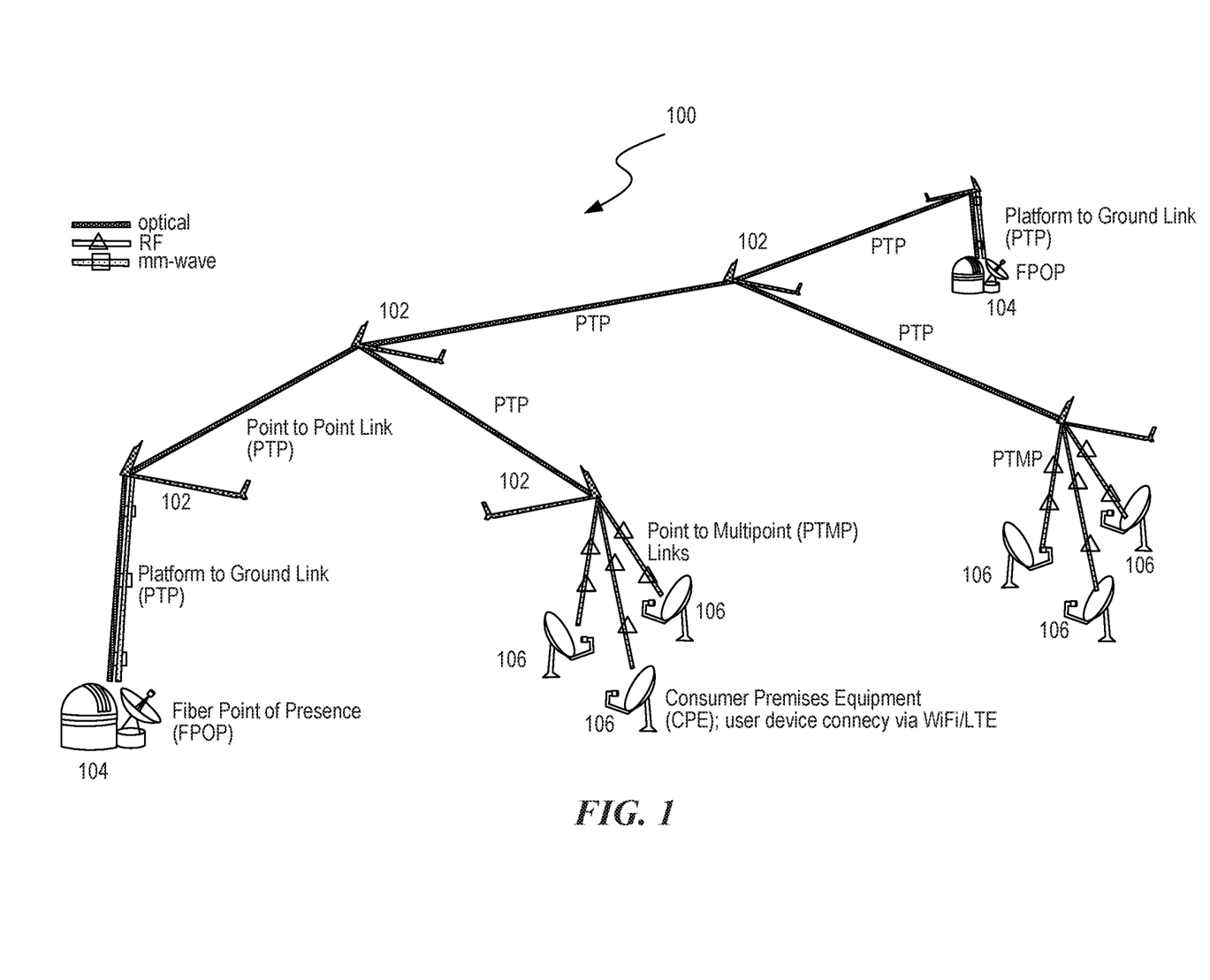
FIG. 1 is a block diagram illustrating a free space communication system within which the disclosed embodiment can be implemented.

Turning now to figures, FIG. 1 is a block diagram illustrating a free space communication system 100 that uses a variety of optical, RF and mm-wave communication links. The communication links in FIG. 1 can be established among moving and stationary components, including aircraft 102 (e.g., UAVs) and ground-based stations 104, 106. One of the challenges in Lasercom is maintaining an accurate line of sight between the receiver and the transmitter, one or both of which may be in motion.

A quadrant detector (also known as a quadrature detector, and often shortened as "quad detector") is a photo detector with four active detector areas. These detectors have the ability to measure extremely small changes in the position of a light beam and are used for detecting and measuring position displacements of an optical beam in a variety of optical systems. Moreover, fast response times of quad detector sensors enable operation at high sampling rates of 100 KHz or higher. These properties of quad detectors make them suitable for use in free space laser communication systems that require precision tracking over large fields of view. The quad detectors further provide a considerable cost advantage over the more expensive focal plane arrays. These focal plane arrays include several detectors with smaller pixel sizes than quad detector, but are often much more expensive (e.g., $100K versus $200), are heavier, have a larger footprint (i.e., occupy a larger space), consume more power and are only capable of operating up to 10 KHz (which is about a factor of 10 slower than the desired 100 KHz operation for free space optical communication systems). It is to be understood that the communications techniques described herein can be applied not just to free space optics, but also to any case where there is a distortion in incident light in an optical field after it propagates through any distorting medium (including, e.g., human tissue).

Figure 2:
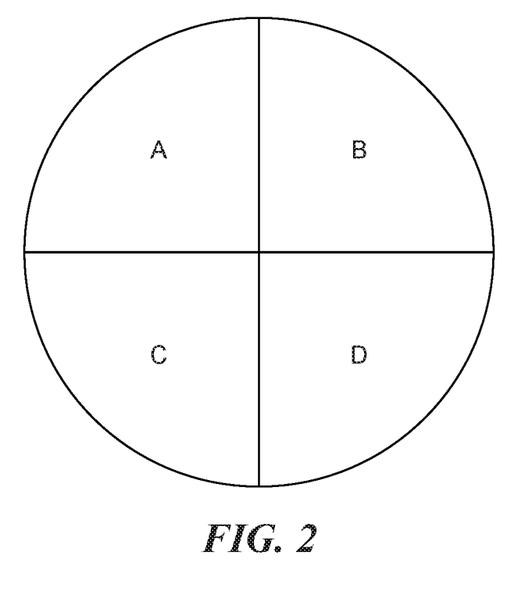
FIG. 2 is a simplified diagram of a quadrant detector.

FIG. 2 is a simplified diagram illustrating the four quadrants of a quad detector. A typical, but optional, operation of the quad detector can involve the following steps. When an incoming light beam impinges on the detector, the position of the centroid of the detected beam is determined based on signals from the four quadrants, A, B, C and D that are shown in FIG. 2. For example, the X and Y displacements can be obtained using the following equations:

$$X=[(A+D)-(B+C)]/[A+B+C+D],$$

$$Y=[(A+B)-(D+C)]/[A+B+C+D].$$

The optical components of the system that includes the quad detector are arranged so that the displacements of the spot in the X and Y directions can be mapped to an angular or lateral displacement of the incoming optical beam. When a quad detector is used in an optical tracking or alignment system, the detected displacement of the optical beam (e.g., the displacement of the centroid of the beam incident on the quad detector) is used as a feedback mechanism to reposition the system or its components to obtain the proper alignment. For example, in a system where a light beam is coupled into a fiber optic channel, the feedback signal from the quad detector can be used to maintain the position of the incoming optical beam at the center of the fiber optic channel.

Figure 3A:
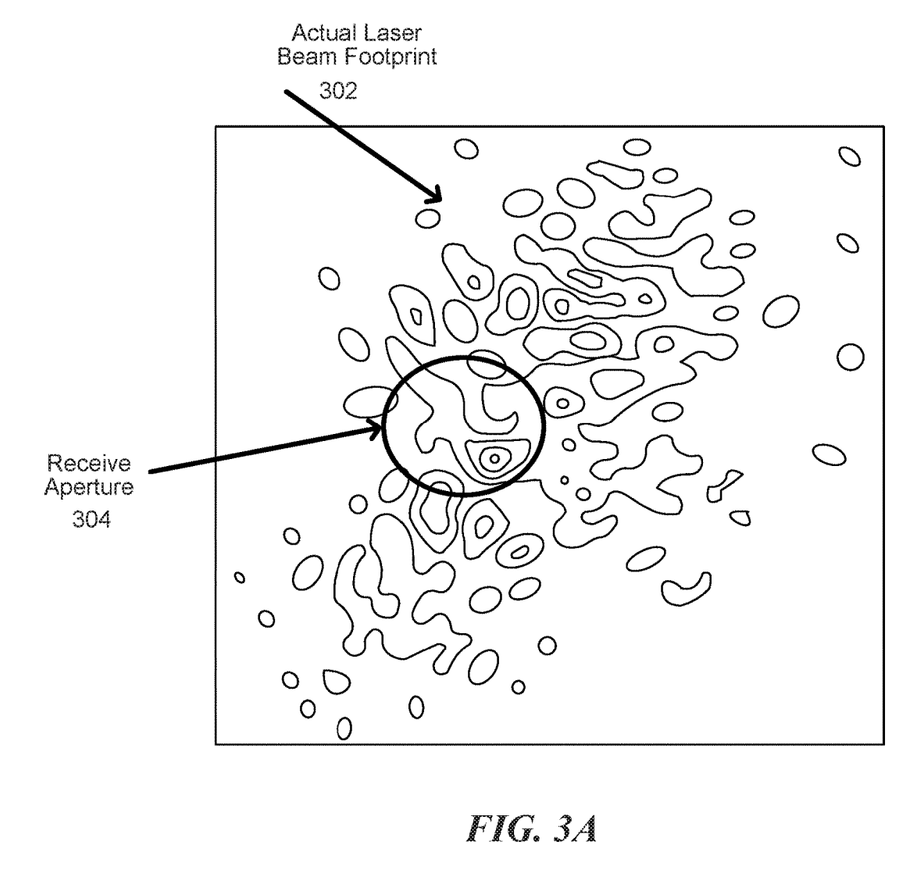
FIG. 3A is a signal diagram illustrating a simulated laser beam signal footprint at a receiver of a free space optical communication system.
Figure 3B:
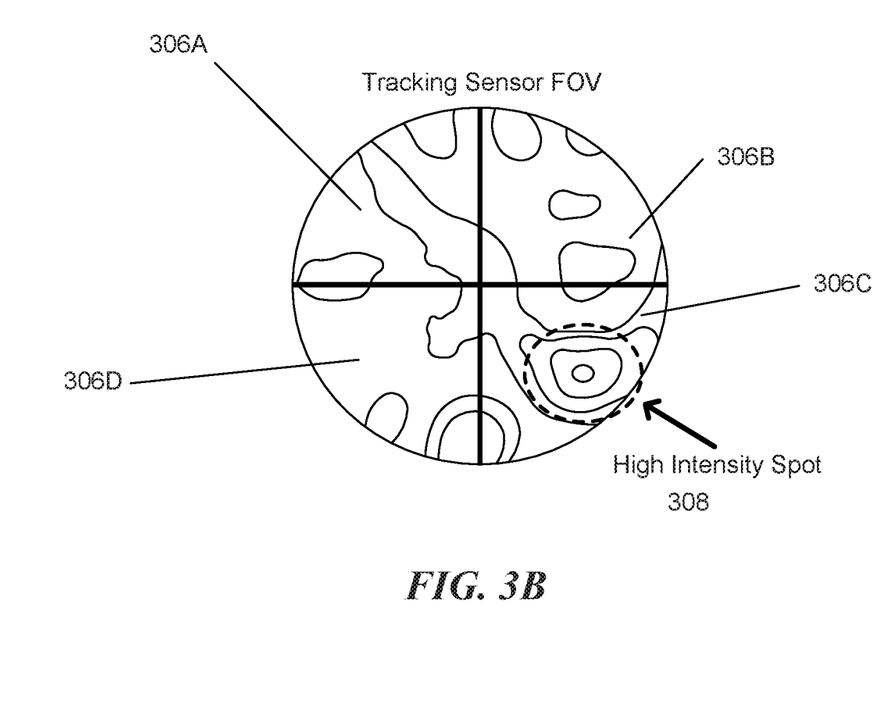
FIG. 3B is a signal diagram illustrating the optical signal received at a quadrant tracker corresponding to the receive aperture shown in FIG. 3A.
Figure 3C:
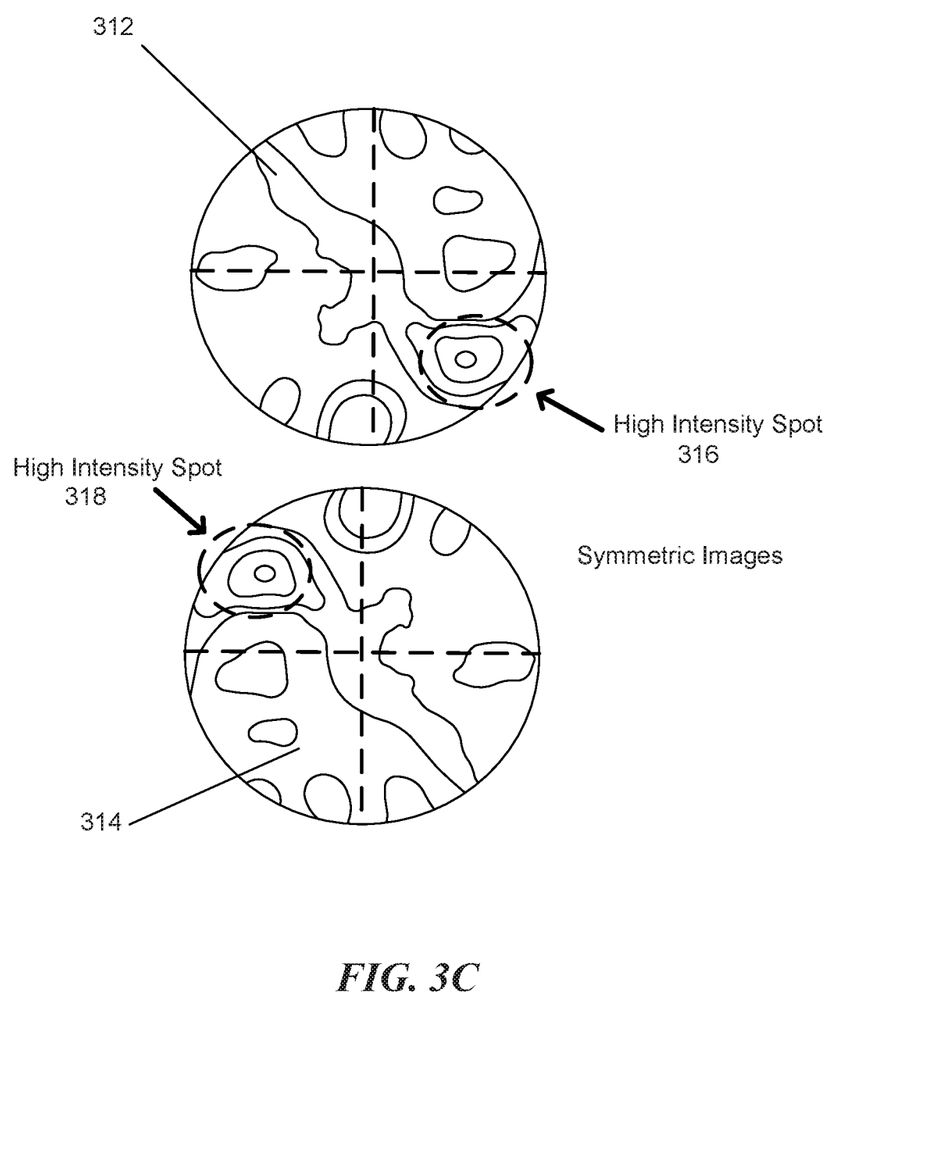
FIG. 3C is a signal diagram illustrating two symmetric images before and after focus positions corresponding to the receive aperture of FIG. 3A.

FIGS. 3A, 3B and 3C are simulated signal diagrams that illustrate how such a two-detector system can produce an improved tracking signal. FIG. 3A illustrates a simulated laser beam footprint 302 that can be received at the entrance of a receiver, denoted as the Receive Aperture 304, in a free space optical communication system. Due to propagation of the laser beam through the atmosphere, the received laser beam profile includes variations due to destructive interference of photons that arrive at the receive aperture 304 after having traveled through different optical paths; these variation, however, are still coherent with respect to each other. FIG. 3B illustrates the optical signal within the field of view (FOV) of the tracking senor (see also the Receive Aperture 304 shown in FIG. 3A that is received at the single quad detector, with four quadrants identified as 306A, 306B, 306C and 306D. As evident from FIG. 3B, the variations in intensity caused by atmospheric scintillation can cause a high intensity portion of the received beam to be incident on the lower right quadrant 306C, which results in erroneous detection of a misalignment in the optical system, although (as evident from FIG. 3A the Receive Aperture 304 is substantially centered with respect to the laser beam footprint. FIG. 3C illustrates two symmetric images 312, 314 corresponding to the same FOV as in FIG. 3A that can be obtained using two quad detectors placed before and after the focal plane, respectively. As shown in FIG. 3C, the high intensity spot 308 of FIG. 3B is now manifested at two high intensity spots 316, 318 located at opposite quadrants of the quad detectors. The symmetry in the high intensity spots 316, 318 is manifested by appearance of those spots at opposite quadrants.

Using two separate quad detectors for such an implementation, however, can have several disadvantages. Aside from the added cost and increased size due to requiring two separate detectors, additional calibration and alignment procedures must be carried out, which result in a more complex and less reliable detection system. Having a simple, compact and accurate detection system is especially important for implementations in airborne devices, such in UAVs, where both the power source (e.g., battery, fuel, etc.) and the real estate within the device are of a premium. For a UAV that is deployed in a rugged environment, it is also important to improve the reliability of the optical detection system, and to simplify maintenance and calibration procedures, which are often inversely proportional to the number of components that are used in such a system. The maintenance and calibration issues can be further exacerbated in a two-detector arrangement in which, in order to allow the light to reach the second detector, a beam splitter is often added to divert a portion of the incoming beam into a different direction and onto the second detector; thus once again adding to the cost and complexity of the detection system.

As a further illustration of the challenges faced by airborne vehicles, components that are deployed at high altitudes in a free space optical communication system (e.g., in a UAV) are often subject to extreme temperature excursions of about 100° C. Maintaining the proper alignment of components under such extreme ranges of temperature is a challenging task; such a task becomes even more difficult when the number of components is increased. Moreover, due to the requirement for additional sensors and components, conducting multiple calibration procedures for UAV subsystems may not be feasible or even possible. Therefore, it is highly desirable to design optical tracking systems that do not require post-deployment calibration procedures.

Figure 4:
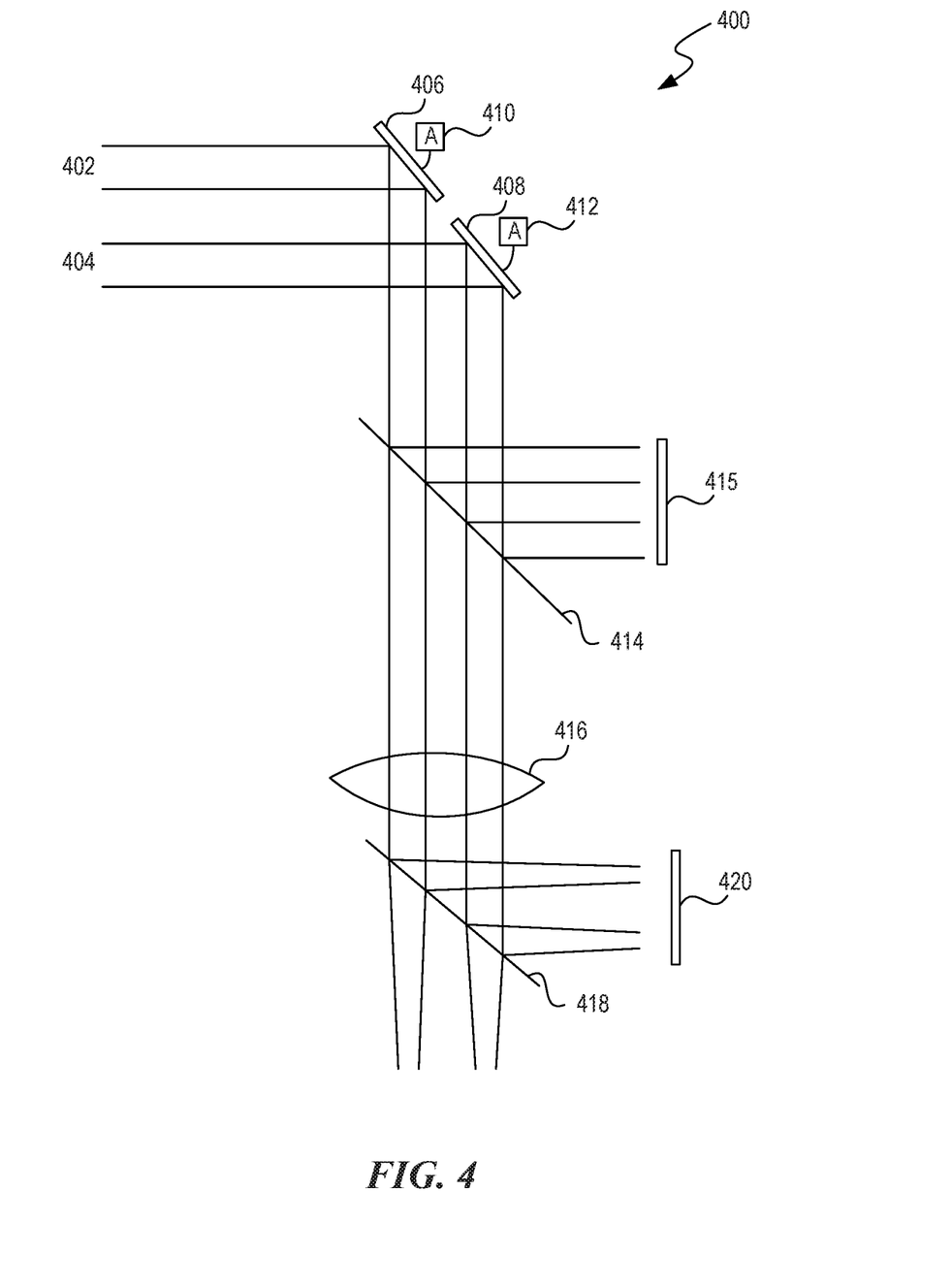
FIG. 4 is a simplified lens diagram illustrating one example of a system in which a sensor is positioned in the path of the collimated light that impinges on various lenses, mirrors, and/or beam splitters, in accordance with an embodiment.

The disclosed embodiments relate to a compact and reliable optical tracking system that can accurately provide the required signal tracking capabilities. FIG. 4 is a simplified lens diagram illustrating one example of such a system 400 in which a sensor is positioned in the path of the collimated light that impinges on various lenses, mirrors, and/or beam splitters. Two collimated lights 402 and 404 reflect on mirrors 406 and 408, respectively. The mirrors 406 and 408 are individually controllable by one or more actuators ("A") 410 and 412, e.g., to change their positions and orientations in all three physical axes. The collimated lights 402 and 404 then proceed via a beam splitter 414, lens 416, and beam splitter 418 before being received by a transceiver (not illustrated). The beam splitter 414 deflects the light to one or more quad detectors 415. The beam splitter 418 deflects the lights to a pixelated sensor 420. The pixelated sensor can be a very low resolution camera sensor (e.g., 64×64 pixels) in various embodiments.

Figure 5:
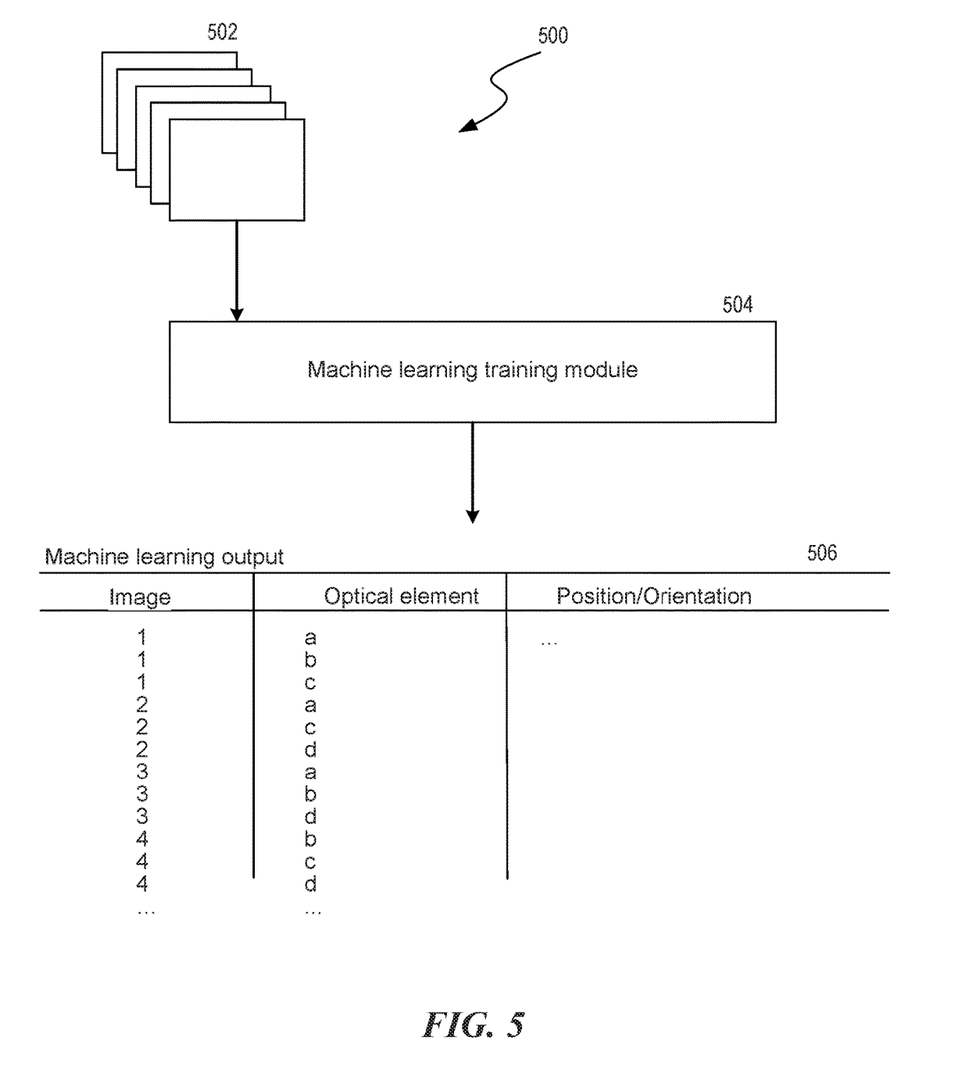
FIG. 5 is a system overview diagram illustrating a training system in accordance with an embodiment.

FIG. 5 is a system overview diagram illustrating a training system 500 in accordance with various embodiments. The training system 500 receives as input multiple images 502. The images may contain coherent, misaligned, or aligned images. The images may be "labeled," meaning that corresponding information is provided indicating what attributes the image has relating to coherence and/or alignment. The images can be input until a machine learning training module 504. The machine learning training module 504 can use various machine learning algorithms, e.g., convolutional neural networks having one or more levels, to generate output 506. In various embodiments, each level can use a same or different machine learning algorithm. The output 506 can associate one or more images with optical elements and their position and/or orientation. As examples, the images can have various levels or patterns of distortion and the associated values can indicate positions and/or orientations of various lenses, mirrors, beam splitters, etc., to compensate for the distortions. The distortions can include various types of distortions, e.g., phase differences, focus errors, etc.

While output 506 illustrates a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Figure 6:
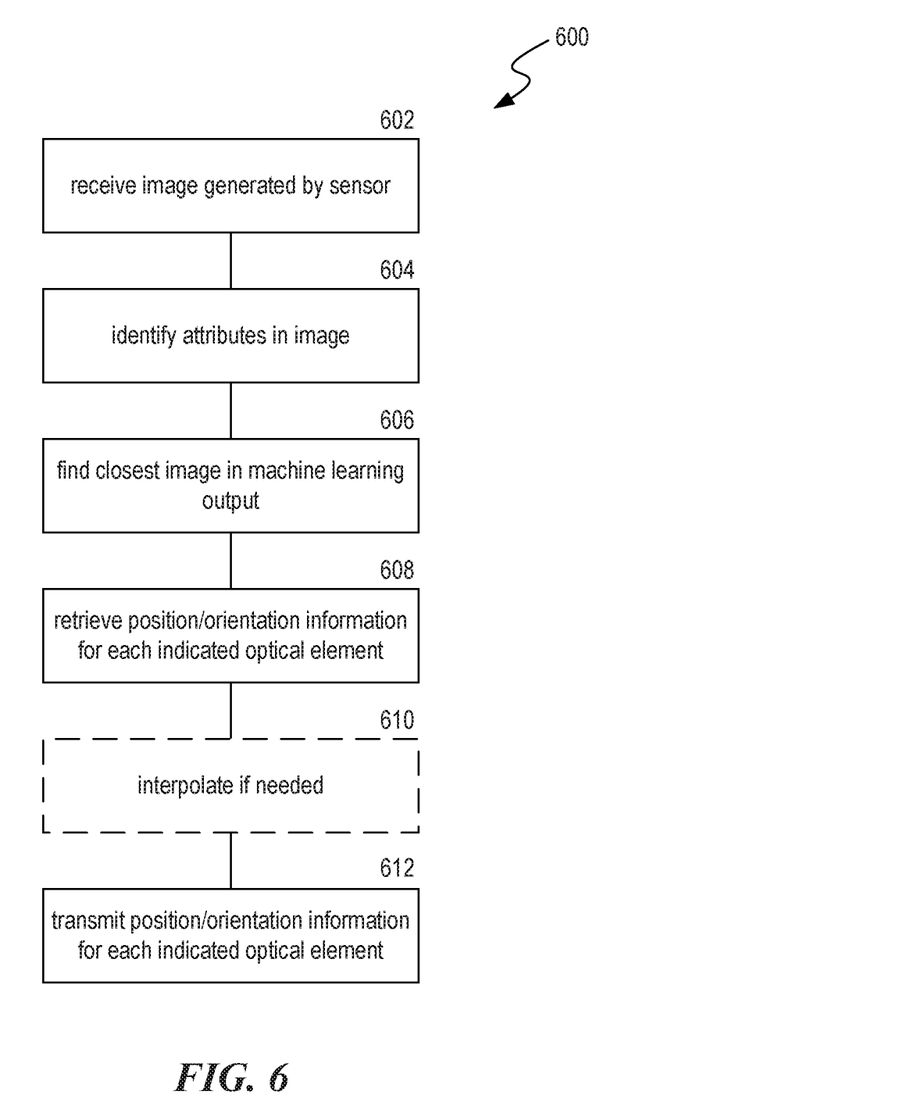
FIG. 6 is a flow diagram illustrating an example optical detection system in accordance with an embodiment.

FIG. 6 is a flow diagram illustrating an example optical detection system. At block 602, the routine receives an image generated by a sensor, e.g., a pixelated sensor. The sensor can detect an image from the light presently falling on the system. In various embodiments, the sensor generates a single image or a sequence of images, e.g., a video stream. At block 604, the routine identifies attributes in the received image, e.g., attributes that can be used to compare images. At block 606, the routine identifies in output 506 which image is "closest" to the image received at block 602. As previously described, various algorithms are known in the art to determine how "close" two images are. When two images are very close, they may indicate the same (or very similar) set of distortions. At block 608, the routine retrieves position/orientation information for each indicated optical element that is associated with the image. At block 610, the routine optionally interpolates values, if needed. As an example, if the received image is nearly midpoint in "closeness" between two images in the output 506, the routine may interpolate the values between the two indicated sets of values. At block 612, the routine transmits the various position and/or orientation information to a controller and commands the controller to adjust the corresponding optical elements.

Those skilled in the art will appreciate that the logic illustrated in FIG. 6 and described above may be altered in a variety of ways. For example, the order of the logic may be rearranged, sub steps may be performed in parallel, illustrated logic may be omitted, other logic may be included, etc.

Figure 7:
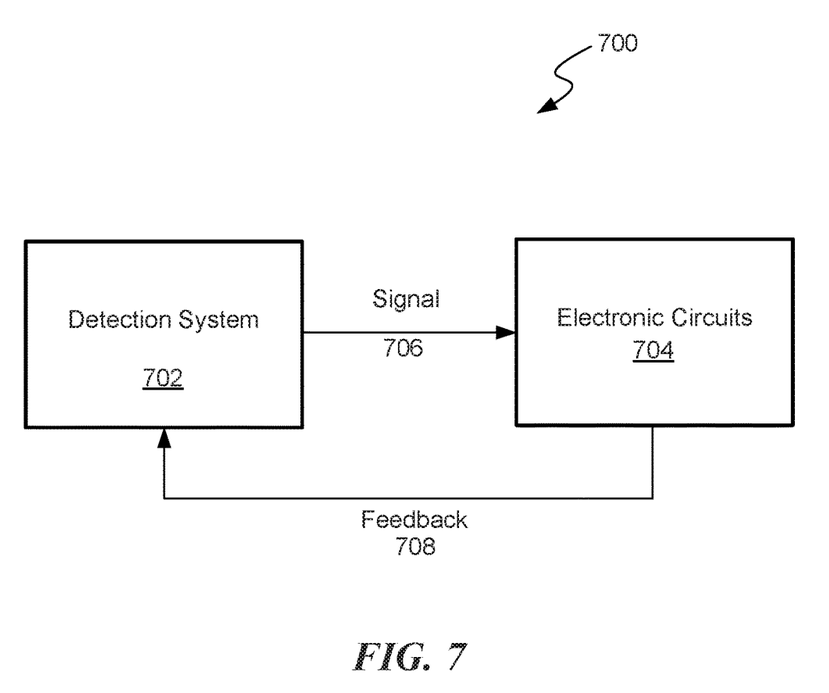
FIG. 7 is a block diagram illustrating an example optical tracking system 700 in accordance with an embodiment

FIG. 7 is a block diagram illustrating an example optical tracking system 700 in accordance with an example embodiment. In the simplified diagram of FIG. 7, the optical system 700 includes a detection system 702 that includes the sensor. The output of the detection system 702 is coupled to electronic circuitry 704 that process the signals received from the optical system, including the signals 706 from the sensor and corresponding information stored in the output table 506, and provides feedback 708 to the detection system 702. In one example, the feedback 708 is a signal that is indicative of the alignment of an optical system with respect to the beam that is received by the optical system. The feedback 708 can be used by other system components (not shown) to move, rotate, or otherwise displace one or more optical elements, so as to adjust the alignment of the component(s) (or the system) with respect to the incoming beam. Alternatively or in addition, the feedback can be used to train or improve various machine learning components of the system.

The electronic circuits can include discrete analog and/or digital components that are, for example, integrated as part of a printed circuit board, and receive and process the signals from the quad detector (or indeed any image sensor). In some implementations, the electronic circuits can include a microprocessor or a controller coupled to a non-transitory computer readable medium. A computer-readable medium may include removable and non-removable storage devices including, but not limited to, Read Only Memory (ROM), Random Access Memory (RAM), etc. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Further, the electronic circuits of FIG. 7 may be implemented as part of larger electronic system that also controls or operates other aspects or components of the optical detection system 700, the receiver/transmitter that is part of a ground-based system or an airborne vehicle. Alternatively, at least part of the electronic circuits 704 of FIG. 7 may be implemented as part of the detection system 702 that is shown in FIG. 7.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, devices, modules and systems, as well as in different sequential orders. Any disclosed implementation or embodiment may further be combined with any other disclosed implementation or embodiment.

What is claimed is:

1. An optical system, comprising:
   a machine learning output storing at least values associated with multiple images, and storing an indication of the multiple images and corresponding positioning or orientation attributes for one or more optical elements;
   a sensor configured to generate an image from an incident beam of light in an optical field after propagating through a distorting medium; and
   a component configured to adjust the one or more optical elements based on the image and the values, wherein the values are interpolated based on distortions in the incident beam of light.

2. The optical system of claim 1, wherein the component is further configured to adjust an orientation or a position of the one or more optical elements based on the values.

3. The optical system of claim 2, wherein the component is further configured to identify a closest image indicated by the multiple images of the machine learning output, and the values are associated with the closest image.

4. The optical system of claim 3, wherein the closest images corresponds to free space optical communications.

5. The optical system of claim 1, wherein a controller controls one or more actuators associated with the one or more optical elements.

6. The optical system of claim 5, wherein the one or more optical elements include a mirror, a beam splitter, or a lens.

7. The optical system of claim 1, further comprising a machine learning training module.

8. The optical system of claim 7, wherein the machine learning training module generates the machine learning output based on a corpus of training images.

9. The optical system of claim 8, wherein the corpus of training images includes images having various amounts of distortions.

10. A method, comprising:
    receiving an image based on an incident beam of light in an optical field after propagating through a distorting medium;
    identifying attributes in the image;
    comparing the image to find a closest image in a machine learning output;
    retrieving associated position or orientation information for at least one optical element indicated by the machine learning output;
    interpolating the associated position or orientation information based on distortions in the incident beam of light; and
    transmitting, via a controller, the associated position or orientation information to the optical element.

11. The method of claim 10 wherein the interpolating includes using values corresponding to two different images stored in the machine learning output.

12. The method of claim 10, further comprising receiving training images and generating the machine learning output by using a training function of one or more machine learning techniques.

13. The method of claim 12, wherein the training function includes supervised learning.

14. The method of claim 12, wherein the training function includes unsupervised learning.

15. A computer-readable storage device storing computer-executable instructions, the computer-executable instructions comprising:
    instructions for receiving an image, the image based on an incident beam of light in an optical field after propagating through a distorting medium;
    instructions for identifying attributes in the image;
    instructions for comparing the image to find a closest image in a machine learning output;
    instructions for retrieving associated position or orientation information for at least one optical element indicated by the machine learning output;
    instructions for interpolating the associated position or orientation information based on distortions in the incident beam of light; and instructions for transmitting, via a controller, the associated position or orientation information to the optical element.

16. The computer-readable storage device of claim 15, wherein the interpolating includes using values corresponding to two different images stored in the machine learning output.

17. The computer-readable storage device of claim 15, further comprising receiving training images and generating the machine learning output by using a training function of one or more machine learning techniques.

18. The optical system of claim 1, wherein the sensor further comprises two or more portions.

19. The method of claim 10, wherein retrieving the associated position or the orientation information for at least one optical element further comprises mapping a displacement of an optical beam spot on a sensor to a displacement of the incident beam of light.

20. The computer-readable storage device of claim 15, wherein retrieving the associated position or the orientation information for at least one optical element further comprises mapping a displacement of an optical beam spot on a sensor to a displacement of the incident beam of light.

* * * * *